2,954,767

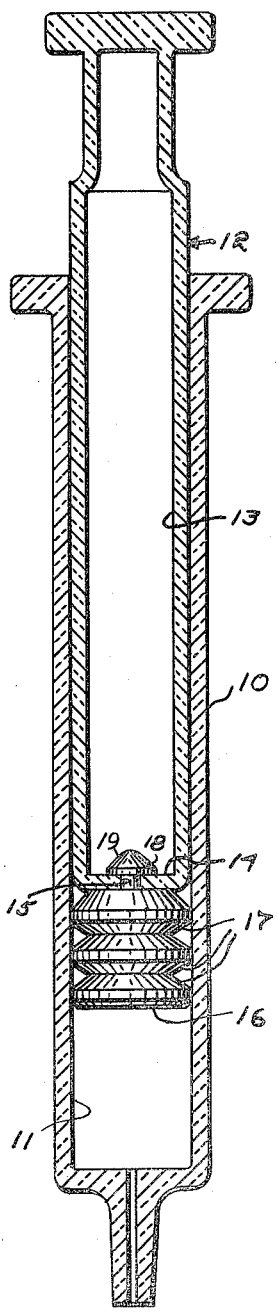
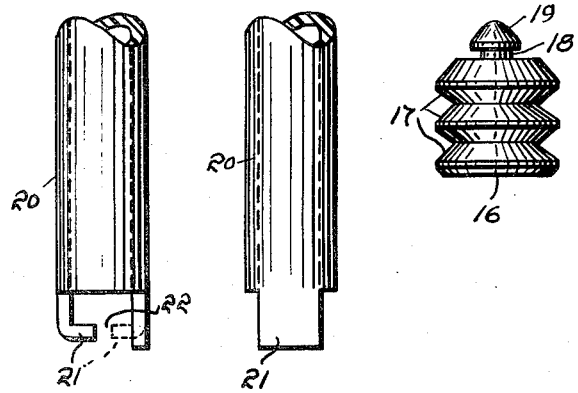
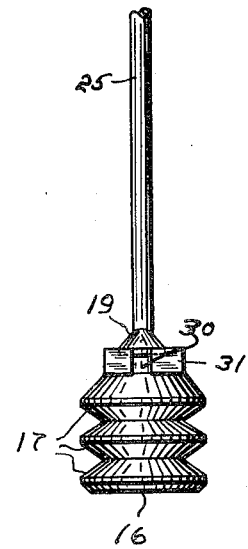
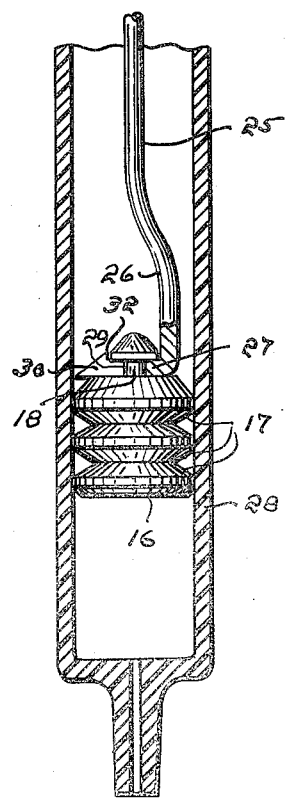

HYPODERMIC SYRINGES AND PLUNGERS THEREFOR

Leo Rane, Chestnut Hill, Mass., assignor to American Cyanamid Company, New York, N.Y., a corporation of Maine Filed Dec. 26, 1957, Ser. No. 705,228

5 Claims. (Cl. 128—218)

This invention relates to hypodermic syringes and particularly to the plungers thereof.

The most important requirement of a hypodermic syringe is that it have an effective seal throughout its working stroke. Real difficulties in providing such seals are experienced in the production of so-called disposable syringes and the general objective of this invention is to provide a hypodermic syringe plunger combining low production costs, smoothness of operation, and effective sealing even with a syringe barrel whose bore is not sufficiently uniform to permit the use of a glass plunger.

This objective is attained in accordance with the invention, by providing the stem portion of a hypodermic syringe plunger with a transverse wall at its distal end having a hole extending therethrough. The stem portion is a free fit in the bore of the barrel and a plunger head of elastic stock is provided that is shaped and dimensioned to slidably enter the barrel bore in resilient sealing relation thereto. The plunger head has a proximally disposed stud terminating in a head and the stud extends through the hole and is preferably but not necessarily under tension holding the proximate faces of the heads resiliently against corresponding faces of the transverse wall.

In the accompanying drawings, there are shown illustration embodiments of the invention from which these and other of its objectives, novel features, and advantages will be readily apparent.

In the drawings,

Fig. 1 is a longitudinal section through a hypodermic syringe having a plunger in accordance with the invention, Fig. 2 is a fragmentary view in elevation of the distal end of another plunger in accordance with the invention, Fig. 3 is a like view of the plunger shown in Fig. 2 turned through 90°, Fig. 4 is a side elevation of the plunger head shown in Fig. 1, Fig. 5 is a fragmentary and partly sectioned view of a hypodermic syringe illustrating another embodiment of the invention, and Fig. 6 is a fragmentary view of the distal end of the plunger shown in Fig. 5 turned through 90°.

In the embodiment of the invention shown in Fig. 1, there is shown a typical hypodermic syringe barrel 10 having a bore 11. The barrel may be of glass or plastic and the bore may be so accurately sized that a conventional glass plunger, not shown, may be inserted therein or it may be so lacking in uniformity that such a glass plunger could not be used with it.

The plunger of Fig. 1 is generally indicated at 12 and is shown as having a hollow stem portion 13 whose transverse distal wall 14 has an axial hole 15 extending therethrough. The plunger 12 may be made of any suitable material, glass or plastic, for example, and its stem portion 13 may be of any cross sectional size and shape so long as it is a free fit in the bore 11 of the barrel 10.

The plunger includes a head 16 of suitable elastic material such as rubber, plastics, or combination thereof, and is provided with annular sealing rings 17 preferably having flattened peripheries. These are so dimensioned as to effect a yieldable, resilient sealing engagement with the bore of the barrel 10 with the resilient seals being comformable to variations of the bore 11 and of sufficient length to ensure an effective seal without interference with proper ease of plunger movement.

The plunger head 16 has its proximal end flat and provided with a stem 18 terminating in a head 19, preferably having a flat distal face. The stem 18 extends through the hole 15, and when under tension, the proximate faces of the plunger and stem heads are brought into resilient contact with the corresponding faces of the plunger wall 14.

The assembly of the plunger stem and plunger head in Fig. 1 requires that the stem head be forced through the hole 15. In order to facilitate assembly, a tubular stem 20 is shown in Figs. 2 and 3 as having end tabs 21 bent inwardly to provide a transverse distal wall having a slot 22 adapted to accommodate the stem 18.

As a further aid to plunger assembly, there is shown in Figs. 5 and 6, a plunger stem 25 having an offset portion 26 terminating in an end wall 27 extending transversely of the axis of the barrel 28. The end wall 27 has a hole 29 extending therethrough and formed with a slot 30 opening through the edge 31 which tapers outwardly and forwardly from the retaining shoulder 32. The slot 30 is wide enough to receive the stem 18 of the plunger head 16 whose annular sealing rings are indicated at 17. The stem 18 has a head 19 whose cross sectional area is greater than that of the hole 29. It will be apparent that this arrangement effects the stretching of the stem 18 as the heads are brought into their correct position axially of the plunger.

What I therefore claim and desire to secure by Letters Patent is:

1. A hypodermic syringe plunger for use with a syringe barrel of predetermined inside diameter, said plunger including a stem portion provided with a distal end wall disposed transversely of the plunger axis and having a hole extending therethrough, including a slot opening through the edge of said wall and a head of elastic stock including a proximally disposed stud terminating in a head of greater cross sectional area than said hole, said stud being dimensioned to enter said slot and extending through said hole with the proximate faces of said heads located on opposite sides of said wall.

2. A hypodermic syringe plunger for use with a syringe barrel of predetermined inside diameter, said plunger including a stem portion provided with a distal end wall disposed transversely of the plunger axis and having a hole extending therethrough, including a slot opening through the edge of said wall, said wall in the zone of said slot tapering outwardly in a distal direction.

3. A hypodermic syringe plunger for use with a syringe barrel of predetermined inside diameter, said plunger including a stem portion provided with a distal end wall disposed transversely of the plunger axis and having a hole extending therethrough, including a slot opening through the edge of said wall, said wall in the zone of said slot tapering outwardly in a distal direction, and a sealing head of elastic stock including a proximally disposed stud terminating in a head, said stud extending through said hole under tension with the proximate faces of said heads resiliently held against corresponding faces of said wall.

4. A hypodermic syringe plunger for use with a syringe barrel of predetermined inside diameter and including a stem portion dimensioned to be a free fit in said barrel and including an offset distal end and a distal end wall disposed transversely of the plunger axis and having an axial opening extending therethrough provided with a slot opening through the edge of said wall, said wall, in the zone of said slot, including a head retaining shoulder and outwardly of said shoulder, tapering in a distal direction, and a piston head of resilient elastic stock including a proximally disposed stud terminating in a head of greater cross sectional area than said hole, said stud being dimensioned to enter said slot and extending through said hole under tension with the proximate faces of said heads resiliently held against corresponding faces of said wall.

5. A hypodermic syringe plunger for use with a syringe barrel of predetermined inside diameter and including a stem portion dimensioned to be a free fit in said barrel and including an offset distal end and a distal end wall disposed transversely of the plunger axis and having an axial opening extending therethrough provided with a slot opening through the edge of said wall, said wall, in the zone of said slot, including a head retaining shoulder and outwardly of said shoulder, tapering in a distal direction, and a piston head of resilient elastic stock including a proximally disposed stud terminating in a head of greater cross sectional area than said hole, said stud being dimensioned to enter said slot and extending through said hole with the proximate faces of said heads being located on opposite sides of said wall.

References Cited in the file of this patent

UNITED STATES PATENTS

| | | |
|---|---|---|
| 858,025 | Reese | June 25, 1907 |
| 1,648,135 | Klett | Nov. 8, 1927 |
| 2,798,487 | Ferguson | July 9, 1957 |
| 2,841,144 | Cohen et al. | July 1, 1958 |

FOREIGN PATENTS

| | | |
|---|---|---|
| 1,041,436 | France | May 27, 1953 |